Figure 1:
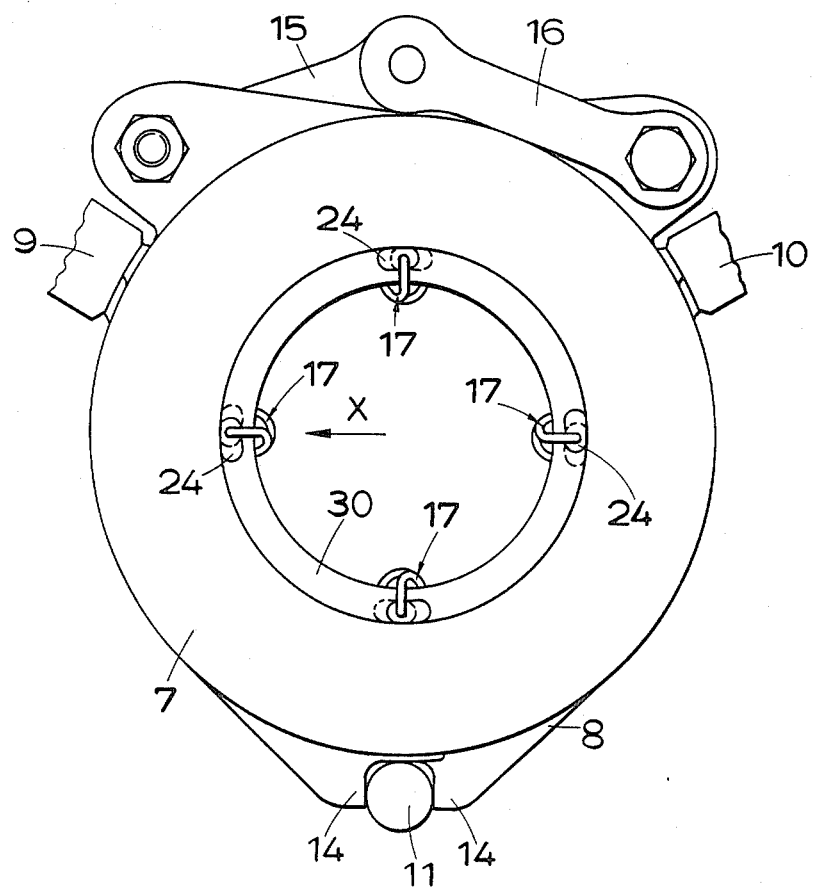

United States Patent [19]

Price et al.

[11] Patent Number: 4,702,351

[45] Date of Patent: Oct. 27, 1987

[54] SELF-ENERGIZING DISC BRAKES

[75] Inventors: Anthony G. Price, Gwent, Wales; Roy Campbell, Worcestershire, England

[73] Assignee: Lucas Industries Public Limited Co., Birmingham, England

[21] Appl. No.: 847,284

[22] Filed: Apr. 2, 1986

[30] Foreign Application Priority Data

Apr. 2, 1985 [GB] United Kingdom ............... 8508543
May 23, 1985 [GB] United Kingdom ............... 8513054
Jun. 7, 1985 [GB] United Kingdom ............... 8514456

[51] Int. Cl.⁴ .................... F16D 55/08; F16F 1/12; B23P 11/00; B21B 1/46
[52] U.S. Cl. ..................... 188/71.4; 29/436; 29/527.5; 164/47; 188/72.7; 267/179
[58] Field of Search ............ 188/70 B, 71.4, 72.2, 188/72.7, 218 XL, 343, 71.3, 106 F; 192/70.23; 267/179, 170, 74; 29/DIG. 67, 148.4 R, 148.4 A, 148.4 B, 527.5, DIG. 1, DIG. 5, 436, 527.6; 164/47, 461, 478

[56] References Cited

U.S. PATENT DOCUMENTS

| 3,101,813 | 8/1963 | Parrett | 188/71.4 |
| 3,734,242 | 5/1973 | Klaue | 188/72.7 X |
| 4,549,636 | 10/1985 | Price et al. | 188/72.2 X |

FOREIGN PATENT DOCUMENTS

| 1162647 | 2/1962 | Fed. Rep. of Germany | 188/72.9 |
| 0033956 | 3/1980 | Japan | 188/72.2 |

Primary Examiner—Andres Kashnikow
Assistant Examiner—Robert J. Oberleitner
Attorney, Agent, or Firm—Daniel J. Hudak Co.

[57] ABSTRACT

A pressure plate for a self-energizing disc brake of the spreading type is provided with angularly spaced integrally cast ears which project inwardly from the inner peripheral edge of the plate, and a recess or dimple is also cast integrally in each ear in the face of the ear adjacent to the braking face. A region of each ear outwardly of the recess or dimple defines an abutment face forming an anchorage for one end of an anchorage portion of a tension return spring with the recess or dimple accommodating the free end of the anchorage portion. In a modification each abutment face may be machined in the respective ear by turning down the ear over an arcuate area passing through the center of the recess or dimple and using the braking face as a datum.

18 Claims, 12 Drawing Figures

SELF-ENERGIZING DISC BRAKES

This invention relates to self-energising disc brakes of the kind in which rotatable friction discs provided with linings of friction material are adapted to be brought into engagement with spaced opposed braking surfaces in a housing by pressure plates located between the friction discs and centred by stationary pilot lugs, balls or rollers are located in co-operating oppositely inclined angularly spaced recesses in the adjacent faces of the pressure plates, and the application of the brake is initiated by moving the pressure plates angularly in opposite directions, the pressure plates then moving apart by a tendency for the balls or rollers to ride up ramps defined by the edges of the recesses so that the pressure plates move into engagement with the friction discs which are urged, in turn, into engagement with the braking surfaces against the force in tension return springs acting between the pressure plates, the pressure plates being carried round with the friction discs until one is arrested by the engagement of a lug on the plate with a drag-taking stop abutment in the housing, and the continued angular movement of the other pressure plate providing a servo action.

Self-energising brakes of the kind set forth may be dry or they may be of the liquid cooled type, and such brakes are commonly used in tractors and like vehicles and are hereinafter called brakes of the kind set forth.

In known self-energising disc brakes of the kind set forth the tension springs are anchored at opposite ends on the pressure plates with curved anchorage portions at opposite ends of the springs co-operating with complementary ears on the pressure plates. In one known construction the ends of the springs are received in drilled holes in the ears, with the springs acting on regions of the ears adjacent to the holes. In another construction the ends of the springs loop over the ears, which are relatively thin in a circumferential direction, with the ends of the springs being located in circumferentially extending recesses in the ears.

In these known constructions the thickness of the ears is substantially less than the thickness of the pressure plates with the ears arranged such that the distance between the adjacent inner faces of the ears is sufficient to accommodate all the coils of a respective tension spring, and the outer faces of the ears are spaced below the braking faces of the pressure plates with co-operate with the friction discs by a distance sufficient to ensure that the ends of the spring do not project above the said braking faces. The reduction in thickness brought about by a sudden change in section causes the ears to become brittle. This is less serious in the construction described above in which the ends of the springs are received in drilled holes since the ears are relatively thick in the circumferential direction. However, in order to provide effective anchorages in the region of the holes, additional spot facing and chamfering operations are necessary. In the other construction described above in which the ends loop over the ears and are located in the recesses in the outer faces of the ears, there is a tendency for the ears to be brittle in the region of the recesses.

In addition, in such known constructions, the tension return springs are highly stressed as a consequence of the limited installation space available, imposed by the braking faces, and splined restraints between the friction discs and a shaft on which they are slidably mounted. As the friction linings wear the pressure plates are moved angularly and axially through greater relative distances. The springs become stressed by a progressively increasing extent and, prior to a fully-worn lining condition being reached, such springs have been known to take a permanent set, and occasionally fracture has occurred. The high spring rate associated with these springs means a high variation in initial fitted load due to tolerances and undesirably high loads during lining wear.

According to one aspect of our invention in a self-energising disc brake of the kind set forth curved anchorage portions at opposite ends of each tension return spring are anchored on at least one complementary inwardly directed radial projection on the pressure plates, and each anchorage portion co-operates with an abutment face on a respective projection with the free end of the anchorage portion received in a recess or dimple in the face of the projection adjacent to the abutment face.

Each projection containing the recess or dimple is cast integrally with the respective pressure plate and is of a thickness less than that of the pressure plate being space from opposite faces of the plate by distances chosen such that all the coils of the spring are accommodated between adjacent inner faces of each of a pair, and the anchorage portions do not project beyond the braking faces of the pressure plates which co-operate with the friction discs when the brake is applied.

Casting the projections integrally facilitates construction and the provision, during the casting process, of the recesses or dimples, conserves the strength of the projections, thereby reducing the tendency for the projections to become brittle.

Usually careful casting control will ensure that the axial spacing between the abutment faces on a pair of projections is within the necessary tolerances, for example to achieve a zero fitted load in the springs when the brake is in an off position with the balls or rollers disposed at the lowermost ends of the ramps. However, should machining be required, the abutment faces can be "turned down" using the braking faces of the pressure plates as a datum. Such a machining operation wil not weaken the projections substantially since it need only be carried out in a arcuate area at the inner ends of the projections and passing substantially through the centres of the recesses or dimples.

The dimples or recesses may be of conical outline to facilitate casting. Preferably, however, the dimples or recesses are elongate in a circumferential direction which permits relative sliding between the pressure plates and the springs to occur as the plates move relatively in an angular direction when the brake is applied.

In such a construction the bases of the recesses or dimples are substantially parallel to the respective abutment faces.

Arranging that such relative sliding between the pressure plates and springs can take plate reduces the relative angular movement between the pressure plates and the springs thereby reducing the angular deviation of the springs from their originally substantially axial alignment when the brake is applied. This enables us to reduce relatively the spring rate, the final load applied by the springs, the number of springs, and the axial thickness of the brake itself and to increase the fitted load, and the diameter of splines on the shaft on which the friction discs are keyed for relative sliding movement.

in addition a gap may be provided in each abutment face at that end of the dimple or recess relatively away from which the spring tends to move as the two pressure plates move relatively angularly in the application of the brake. A respective anchorage portion at one end of a respective tension spring is passed through the gap into the dimple or recess. This reduces the tension which is applied to the spring during assembly thereby eliminating undesirably high stresses.

According to another aspect of our invention a pressure plate for a disc brake of the kind set forth is provided with at least one integrally cast projection which projects inwardly from its inner peripheral edge, and a recess or a dimple is also cast integrally in the projection in the face of the projection adjacent to the braking face of the pressure plate which is adapted to co-operate with a friction disc in the assembled brake, a region of the projection radially outwards of the recess or dimple defining an abutment face forming an anchorage for an anchorage portion at one end of a tension return spring with the recess or dimple accommodating the free end of the anchorage portion.

The recesses or dimples may be of conical outline to facilitate casting, but, preferably, are elongate in a circumferential direction to permit relative sliding between the pressure plates and the springs to occur as the plates move relatively angularly in an angular direction when the brake is applied.

Preferably a gap is provided in each anchorage portion at one end of each recess or dimple and through which the anchorage portion at one end of a respective tension spring can be pressed into the recess or dimple during assembly of the brake.

Figure 2:
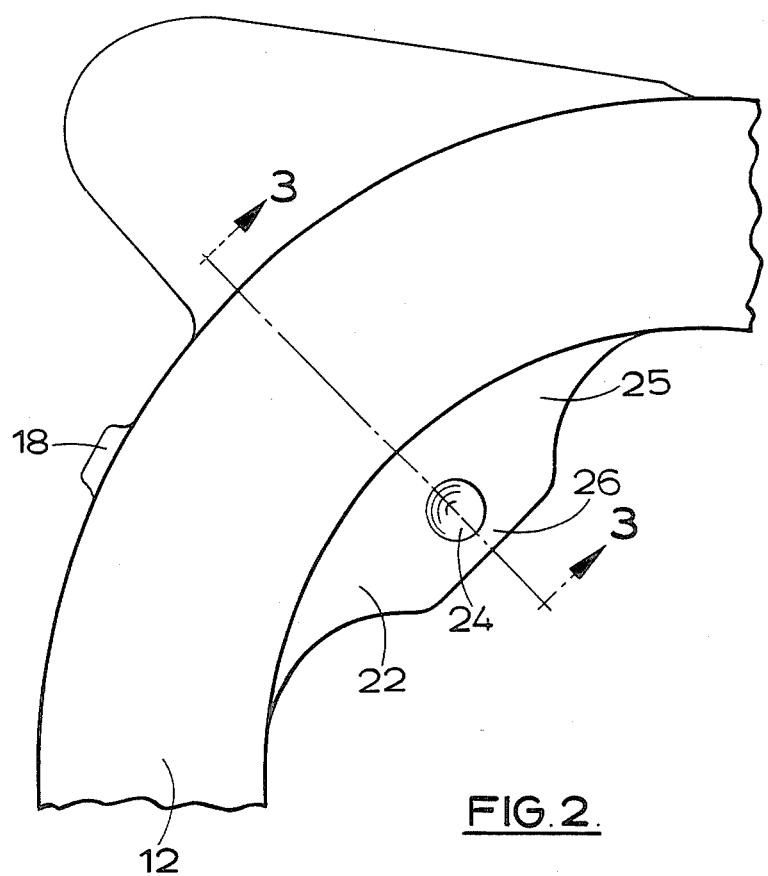
Figure 3:
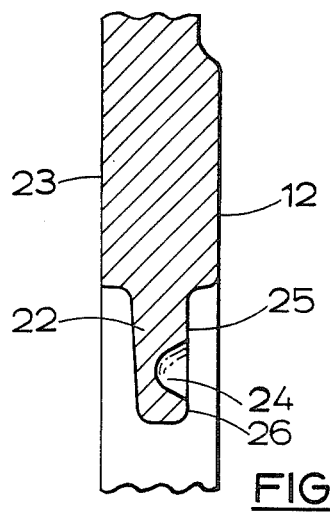
Figure 4:
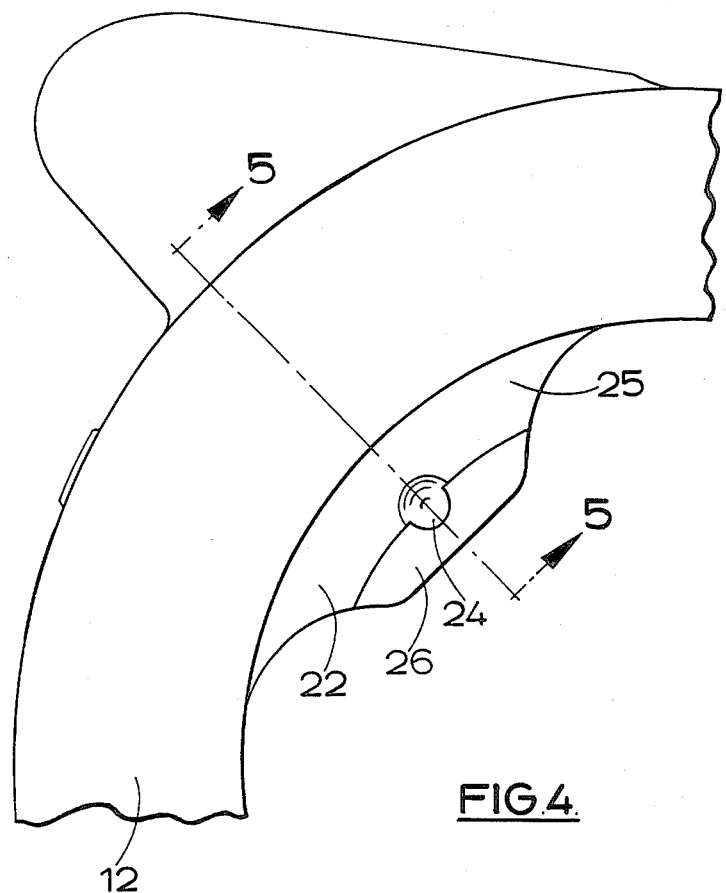
Figure 5:
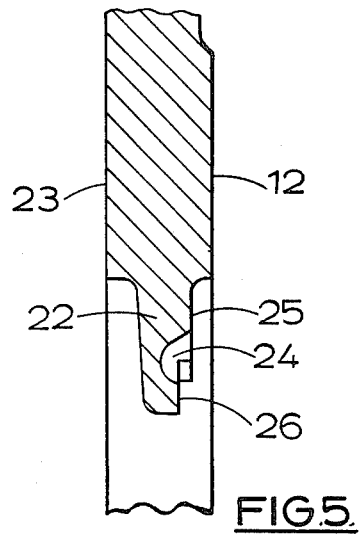
Figure 7:
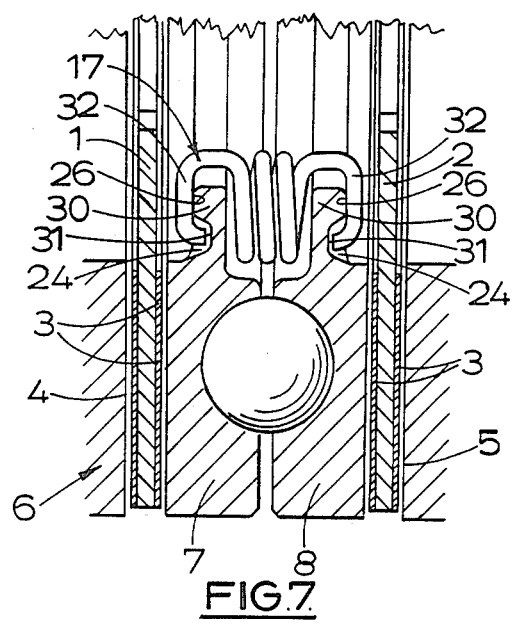
Figure 9:
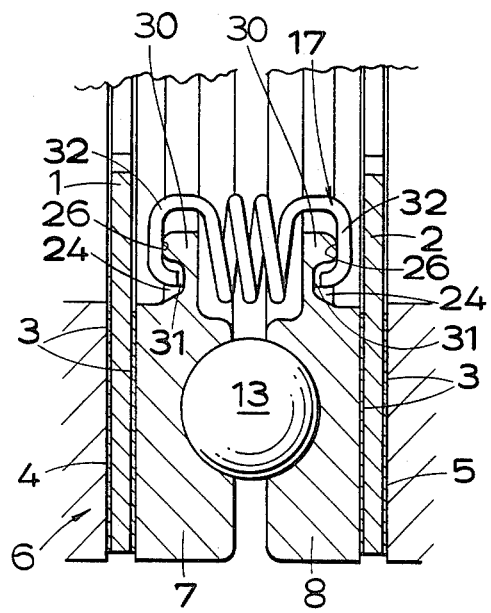
Figure 8:
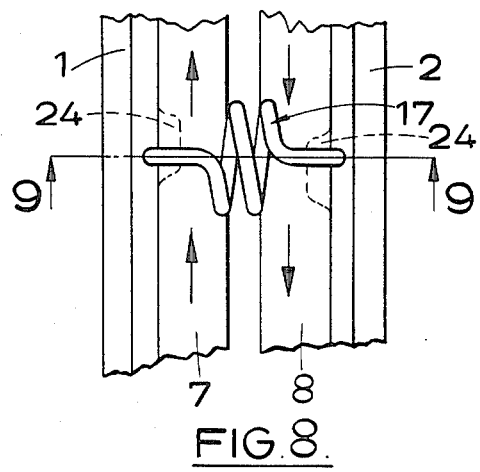
Figure 10:
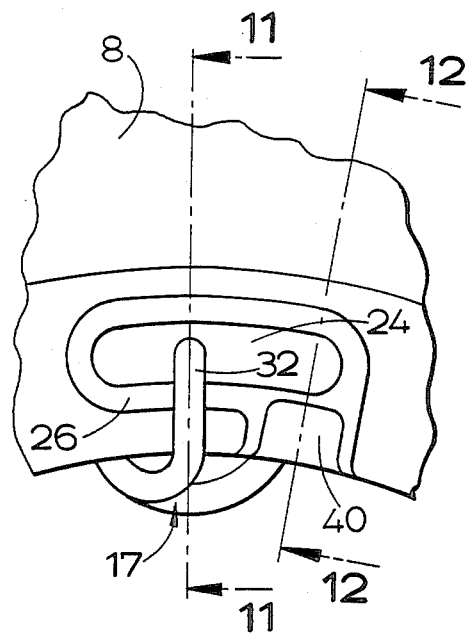
Figure 11:
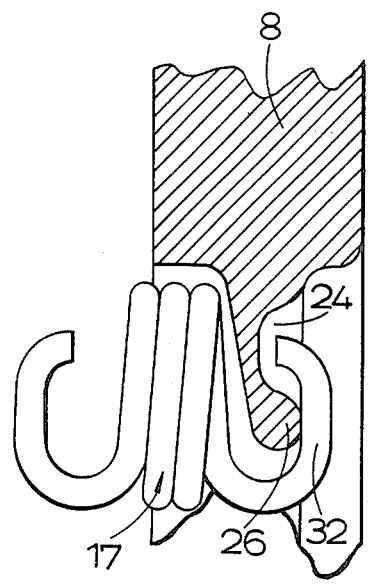
Figure 12:
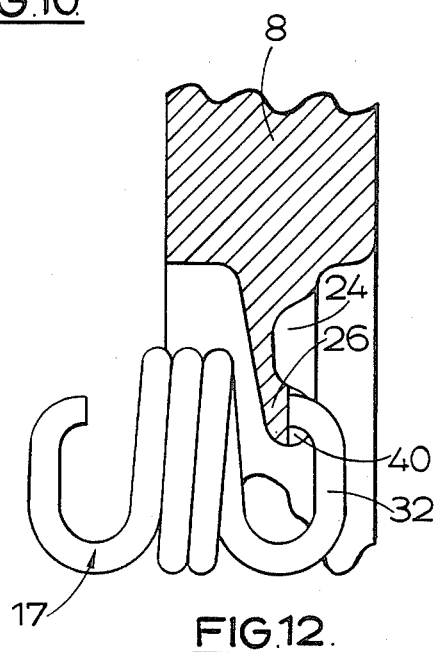

Three embodiments of self-energising disc brake of the spreading type in accordance with our invention are illustrated in the accompanying drawings in which:

FIG. 1 is a plan view of a self-energising disc brake;
FIG. 2 is a plan of a portion of a first pressure plate;
FIG. 3 is a section on the line 3—3 of FIG. 1;
FIG. 4 is a plan of a portion of another pressure plate;
FIG. 5 is a section on the line 5—5 of FIG. 4.
FIG. 4 is a view in the direction of the arrow 'X' in FIG. 1 but showing a modification;
FIG. 7 is a section on the line 7—7 of FIG. 6;
FIG. 8 is a view similar to FIG. 6;
FIG. 9 is a section on the line 9—9 of FIG. 8;
FIG. 10 is a portion of a pressure plate having a modified dimple or recess;
FIG. 11 is a section on the line 11—11 of FIG. 10; and;
FIG. 12 is a section on the line 12—12 of FIG. 10 showing a spring being fitted.

A brake of the spreading type illustrated in the drawings comprises a pair of rotatable friction discs 1, 2 provided on opposite sides with linings 3 of friction material which are adapted to be brought into engagement with spaced opposed, radial braking surfaces 4, 5 in a housing 6 by pressure plates 7, 8 located between the discs and centred by three angularly spaced stationary pilots 9, 10, 11. One of the pressure plates 8 is illustrated in FIGS. 2 and 3 of the drawings, and a braking face 12 on one side of the plate engages with the adjacent friction disc. Balls or rollers 13 are located in co-operating oppositely inclined recess in the opposite faces of the pressure plates 7,8 which are adjacent in the brake.

The application of the brake is initiated by moving the pressure plates 7, 8 angularly in opposite directions which causes the pressure plates to move axially relatively away from each other due to the tendency for the balls or rollers 13 to ride up ramps defined by the end faces of the recesses. This urges the friction discs 1, 2 into engagement with the surfaces 4, 5 in the housing 6. The pressure carried round with the discs until one is arrested by plates 7, 8 are then the engagement of a lug 14 on a respective plate with a drag-taking abutment 11, as will hereinafter be described, whereafter continued angular movement of the other plate provides a servo action.

The brake is applied mechanically for parking or in an emergency by a pull-rod (not shown) which extends through a radial opening in the housing and is coupled to the outer ends of a pair of toggle links 15, 16 of which the inner ends are pivotally connected to respective pressure plates 7, 8.

For normal service braking the brake may be applied hydraulically by an hydraulic actuator which acts between lugs on the respective pressure plates. The lugs are displaced angularly from the toggle links.

In an inoperative position the two pressure plates 7, 8 are urged towards each other by angularly spaced tension return springs 17 which act between the two plates 7, 8 and are anchored between ears on the two plates. The two plates 7, 8, the balls or rollers 13, and the tension spring 17 constitute an actuator assembly.

As shown in FIGS. 2 and 3 each pressure plate 7, 8 is generally of annular outline provided with radially disposed angularly spaced lugs 18 which project outwardly from its outer peripheral edge for brake application and centering purposes, and a pair of projections comprising diametrically opposed ears of which only one is shown at 22 and which project inwardly from the inner peripheral edge. Each ear 22, which is of substantial width in a circumferential direction, is spaced inwardly on opposite sides from the braking face 12 and from the opposite face 23 of the plate which contains the recesses in which the balls or rollers 13 are received. A stopped recess or dimple 24 of conical outline is provided in each ear 22 in the face 25 of the ear 22 adjacent to the braking face 12, and the recess or dimple 24 is positioned substantially at the mid-point in the circumferential length of the ear 22. A portion of the face 25 positioned radially outwards of the recess or dimple 24 defines an abutment face 26, which forms an anchorage for a deformed, cranked, or otherwise curved anchorage portion at an end of the tension return spring 17. Spherically the free end of the anchorage portion is accommodated in the recess or dimple 24 with clearance.

The pressure plate 7, 8, the ears 22 and the dimple or recess 24 are all cast integrally in a single casting operation, and the spacing between the abutment faces 26 of a pair of pressure plates 7, 8 is chosen to provide zero fitted load in the respective tension return spring when the brake is in a normal inoperative "off" position.

In this construction, only the braking face 12 is machined to provide an effective engagement with an adjacent friction lining of a friction disc.

In the modified pressure plate illustrated in FIGS. 4 and 5 the abutment face 26 is provided as an arcuate area which is machined from the ear 22 using the braking face 12 as a datum.

This is necessary in constructions in which the casting control does not maintain the spacing between the cast abutment faces 26 in pairs of pressure plates within the necessary tolerances to achieve substantially zero fitted loads in the tension spring.

The construction of the pressure plate of FIGS. 4 and 5 is otherwise the same as that of FIGS. 2 and 3 and corresponding reference numerals have been applied to corresponding parts.

In the embodiment illustrated in FIGS. 6–9 of the accompanying drawings, and also as shown in FIG. 1, each pressure plate 7, 8 is provided with a projection in the form of an inwardly directed radial portion or lip 30 of annular outline which replaces the individual, angularly spaced, lugs 22 of the constructions of FIGS. 2–5, and the recesses or dimples 24 are elongate in a generally circumferential direction with the bases 31 of the recesses substantially parallel to the abutment faces 26.

Figure 6:
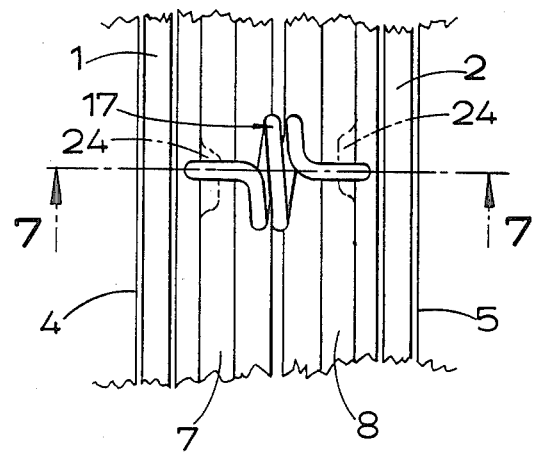

In a position of initial setting shown in FIG. 6 of the drawings, the anchorage portions 32 of the springs 17 co-operate with regions of the abutment face 26 which are adjacent to opposite ends of the two corresponding recesses 24. As the linings 3 wear and the pressure plates 7 and 8 are moved relatively further angularly and axially to compensate for wear of the linings, the anchorage portions 32 slide over the abutment faces 26 to co-operate, in the fully-worn condition shown in FIG. 8 of the drawings and in chain-dotted outline in FIG. 1, with regions at the opposite ends of the two recesses 24.

The construction of the embodiment of FIGS. 6–9 is otherwise the same as those of FIGS. 2–5 and corresponding reference numerals have been applied to corresponding parts.

As shown in the embodiments of FIGS. 10–12 a gap 40 is provided in the anchorage portion 26 at one end of the recess 24 and through which the free end of the anchorage portion 32 of the spring 17 is passed into the recess 24 as shown in FIG. 12. The portion 32 is then moved in a circumferential direction relatively away from the gap 40 and into an initial, assembled, position shown in FIG. 11.

Since the pressure plates 7,8 are similar in construction, the gaps 40 are provided at the respective ends of the recesses 24 relatively away from which the portions 32 will tend to move when the brake is applied as shown by the arrow in FIG. 10.

The gaps 40 enable the springs 17 to be assembled without tensioning or otherwise over-stressing since it is not necessary for the free ends to be sprung over the anchorage portions 26 to couple the springs to the pressure plates 7,8.

We claim:

1. A self-energising disc brake comprising a housing, first and second axially spaced braking surfaces in said housing, radial pilot lugs and a drag-taking stop abutment in said housing, first and second pressure plates centred on said pilot lugs, tension return springs acting between said plates, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and means for moving said pressure plates angularly relative to said housing to initiate application of said brake with said pressure plates also moving axially against the force in said tension springs to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein each pressure plate is provided with at least one inwardly directed radial projection having opposed abutment faces and a spring recess adjacent to each said abutment face, said spring recess being a stopped recess which does not extend completely through the thickness of said radial projection, and said tension springs having opposite free ends provided with curved anchorage portions which are anchored on respective said radial projections with each said anchorage portion co-operating with a respective one of said abutment faces and with each said free end received within a respective said adjacent spring recess.

2. A disc brake according to claim 1, wherein said spring recesses are of conical outline.

3. A disc brake according to claim 1, wherein said spring recesses are elongate in a circumferential direction and said free ends are circumferentially slideable in said spring recesses during relative angular movement of said pressure plates.

4. A disc brake according to claim 3, wherein said spring recesses are stopped recesses and have bases which are substantially parallel to the said respective abutment faces.

5. A self-energising disc brake comprising a housing, first and second axially spaced braking surfaces in said housing, radial pilot lugs and a drag-taking stop abutment in said housing, first and second pressure plates centred on said pilot lugs, tension return springs acting between said plates, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plates and said braking surfaces carried by opposite faces of said discs, and means for moving said pressure plates angularly relative to said housing to initiate application of said brake with said pressure plates also moving axially against the force in said tension springs to urge said friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein each pressure plate is provided with at least one inwardly directed radial projection having opposed abutment faces and a spring recess adjacent to each said abutment face, the spring recess of at least one pressure plate being an elongate recess and extend circumferentially, and said tension springs having first and second free ends provided with curved anchorage portions which are anchored on respective said radial projections with each said anchorage portion co-operating with a respective one of said abutment faces, each of said first free ends being slideably received within a respective said elongate spring recess, and wherein relative sliding of said first free end of said tension return spring in said elongate spring recess during relative angular movement between said pressure plates reduces or eliminates the change of angle of said return spring relative to the axial direction of the brake in comparison to that change of angle of said return spring relative to the axial direction of the brake which would otherwise occur during said relative angular movement between said pressure plates if said return spring were not able to slide in said elongate spring recess.

6. A disc brake according to claim 1 or claim 5, wherein said tension spring include coils, and wherein said spring recess and said projection containing said spring recess are cast integrally with the respective pressure plate and said projection is of a thickness less than that of the pressure plate and is spaced from opposite faces of said plates by distances chosen such that all said coils of said spring are accommodated between adjacent inner faces of each of a pair, and said anchorage portions do not project beyond said braking faces of said pressure plates which co-operate with said friction discs when said brake is applied.

7. A disc brake according to claim 6 wherein said abutment faces are machined to provide a desired axial separation of pairs of abutment faces, machining only being carried out in an arcuate area at the radially inner ends of said projections, the arc of said arcuate area passing substantially through the centres of the spring recesses.

8. A disc brake according to claim 1 or claim 5 wherein a gap is provided in each said abutment face at that end of said recess relatively away from which the respective said spring tends to move when said brake is applied, and through which a respective said anchorage portion at one end of said spring is passed into said spring recess.

9. A disc brake according to claim 5 wherein the spring recesses of both pressure plates are elongate spring recesses and said second free ends are slideably received in the elongate spring recesses of the second pressure plate and wherein said change in angle is reduced or eliminated by said free ends sliding in their respective elongate recesses during relative angular movement between the pressure plates.

10. A disc brake according to claim 5 wherein said elongate spring recesses are stopped recesses and have bases.

11. A pressure plate for a self-energising disc brake of the type comprising a housing, first and second axially spaced braking surfaces in said housing, radial pilot lugs and a drag-taking stop abutment in said housing, first and second pressure plates centred on said pilot lugs, tension return springs acting between said plates, adjacent faces of said pressure plates being provided with co-operating oppositely inclined angularly spaced recesses, rolling bodies located in complementary pairs of said recesses, a rotatable friction member disposed between each said pressure plate and an adjacent said braking surface, each said member comprising a disc, and first and second linings of friction material for engagement with said pressure plate and said braking surface carried by opposite faces of said discs, and means for moving said pressure plates angularly relative to said housing to initiate application of said brake with said pressure plates also moving axially against the force in said tension springs to urge the friction members into engagement with said braking surfaces due to a tendency for said rolling bodies to ride up ramps defined by said end faces and constituting camming means, said plates being carried round with said discs until one of said plates is arrested by the engagement of a lug on that plate with said drag-taking stop abutment, whereafter continued angular movement of the other of said plates provides a servo action, wherein said pressure plate is provided with at least one integrally cast projection which projects outwardly from the inner peripheral edge thereof, and recess dimple is also cast integrally in said projection in a face of said projection adjacent to said braking face of said pressure plate which is adapted to co-operate with a friction disc in the assembled said brake, a region of the projection radially outwards of the recess dimple defining an abutment face forming an anchorage for an anchorage portion at one end of a tension return spring with said recess dimple accommodating a free end of the said anchorage portion.

12. A pressure plate according to claim 11, wherein said recess dimple is of conical outline.

13. A pressure plate according to claim 11, wherein said recess dimple is elongate in a circumferential direction.

14. An actuator assembly for a disc brake of the self-energising type comprising first and second pressure plates which have inner and outer peripheral edges and which are superimposed upon each other, rolling bodies are located in co-operating inclined angularly spaced recesses in adjacent faces of said pressure plates, and tension return springs act between said pressure plates to urge them towards each other with said bodies urged towards lower ends of ramps defined by edges of said recesses, wherein each said pressure plate is provided with at least one integrally cast projection which projects inwardly from the inner peripheral edge thereof and a spring recess is also cast integrally in the face of said projection which is remote from said adjacent face of said pressure plate, a region of said projection in each said plate radially outwards of said recess defining an abutment face forming an anchorage for an anchorage portion at a respective end of a respective tension spring with said spring recess accommodating a free end of the said anchorage portion.

15. An actuator assembly according to claim 14, wherein said spring recesses are of conical outline.

16. An actuator assembly according to claim 14, wherein said spring recesses are elongate in a circumferential direction and said free ends are circumferentially slideable in said spring recess during relative angular movement between said pressure plates.

17. An actuator assembly according to claim 16, wherein bases of said spring recesses are substantially parallel to the said respective abutment faces.

18. An actuator assembly according to claim 16, wherein a gap is provided in each said abutment face at that end of said spring recess relatively away from which the respective spring tends to move when the plates move angularly with respect to each other, and through which a respective anchorage portion on said spring is passed into said spring recess.

* * * * *